(No Model.)
J. CURRAN.
DEVICE FOR PASSING THE DEAD CENTER OF A CRANK MOTION.
No. 350,417. Patented Oct. 5, 1886.
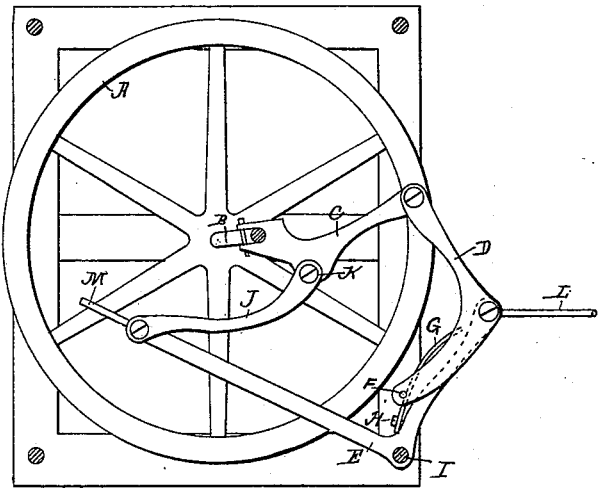
Fig. 1.
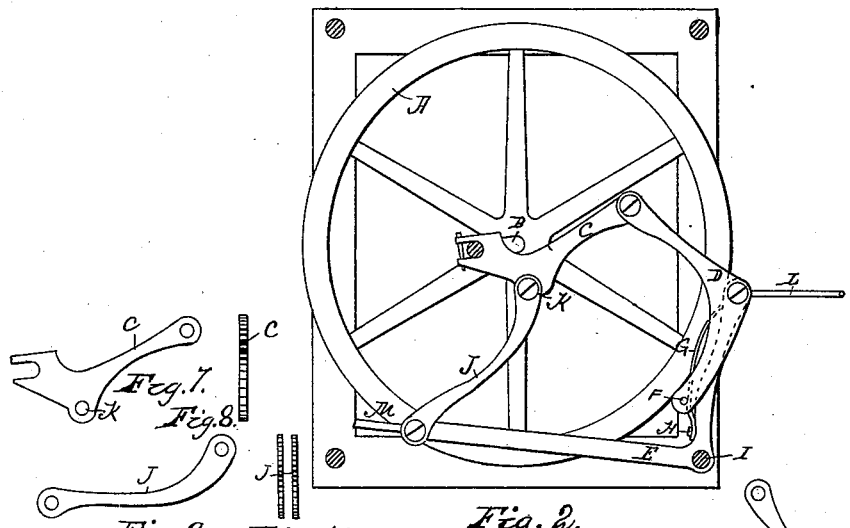
Fig. 2.
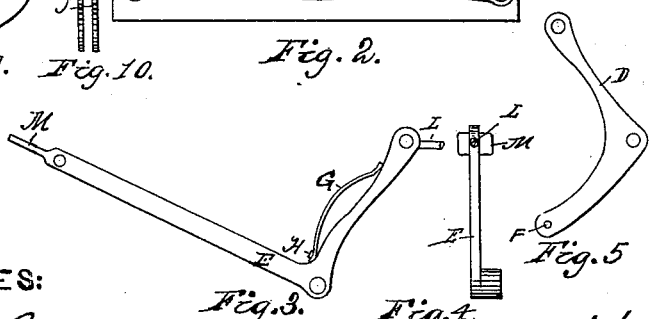
WITNESSES:
Thomas F. Brady
Chas. A. Mahony
INVENTOR
John Curran
by his attorney
Chas. A. Rutter.

United States Patent Office.

JOHN CURRAN, OF PHILADELPHIA, PENNSYLVANIA.

DEVICE FOR PASSING THE DEAD-CENTERS OF A CRANK-MOTION.

SPECIFICATION forming part of Letters Patent No. 350,417, dated October 5, 1886.

Application filed June 19, 1886. Serial No. 205,711. (No model.)

*To all whom it may concern:*

Be it known that I, JOHN CURRAN, a citizen of the United States, and a resident of the city and county of Philadelphia, and State of Pennsylvania, have invented a new and useful Improvement in Devices for Passing the Dead-Centers of a Crank-Motion, of which the following is a specification.

The object of my invention is to furnish a device by means of which the dead-centers of a crank-motion will be overcome automatically, and so save the time and trouble that are now necessary to pry the crank over these points when the machine comes to rest upon one of them.

In the accompanying drawings, forming part of this specification, and in which similar letters of reference indicate similar parts throughout the several views, Figure 1 is a side elevation of a fly-wheel and crank embodying my device for passing the dead-centers, the machine being at rest and one of the dead-centers having just been passed; Fig. 2, a similar view, the other dead-center having just been passed; and Figs. 3 to 10 are details of my device.

A is the fly-wheel; B, the crank; C, an arm, one end of which is secured to the crank B, and the other of which is pivoted to the upper end of a link, D. A side and end view of arm C are shown in Figs. 7 and 8.

The link D is pivoted near its middle to the upper end of the bell-crank lever E, and its lower end is furnished with a pin, F, against which a spring, G, bears. One end of this spring is secured to the arm of bell-crank E, to which link D is pivoted by means of a screw, H. Instead of the flat spring shown in the drawings, a helical spring may be used, one end of which would bear against the short arm of bell-crank E and the other against the lower end of link D.

The bell-crank E is pivoted upon a stationary rod, I. A side and end view of the bell-crank are shown in Figs. 3 and 4, and a side and end view of link D are shown in Figs. 5 and 6. To the long arm of bell-crank E is pivoted a link, J. The other end of this link is pivoted to the lower part of arm C at K.

Figs. 9 and 10 are an end and side view of link J.

As the crank approaches the dead-center shown in Fig. 1 the arm C draws the upper end of link D down and throws the lower end of this link out, compressing the spring G. Just before the dead-center is reached the arm C ceases to act, and the spring G throws the lower end of link D in and throws its upper end out, and through arm C carries the crank over the dead-center. In approaching the dead-center shown in Fig. 2 the spring G is again compressed, but is again released before reaching this point, and throws the crank over.

The various points at which the arms and links are pivoted to each other are so arranged that no two of them will be in line with the center of the crank-pin at the same time.

The power may be applied to the device by means of a connecting-rod, L, secured to the shorter arm of the bell-crank E, or it may be applied by means of a treadle, M, on the long arm of bell-crank E.

Having thus described my invention, I claim—

The combination, with a crank, of the arm C, link D, bell-crank E, spring G, and link J, all arranged and operating substantially as and for the purposes set forth.

JOHN CURRAN.

Witnesses:
OTIS EGAN,
CHAS. A. RUTTER.